R. T. BOAL.
SAFETY BELT AND CLUTCH SHIFTING MECHANISM.
APPLICATION FILED DEC. 15, 1914.

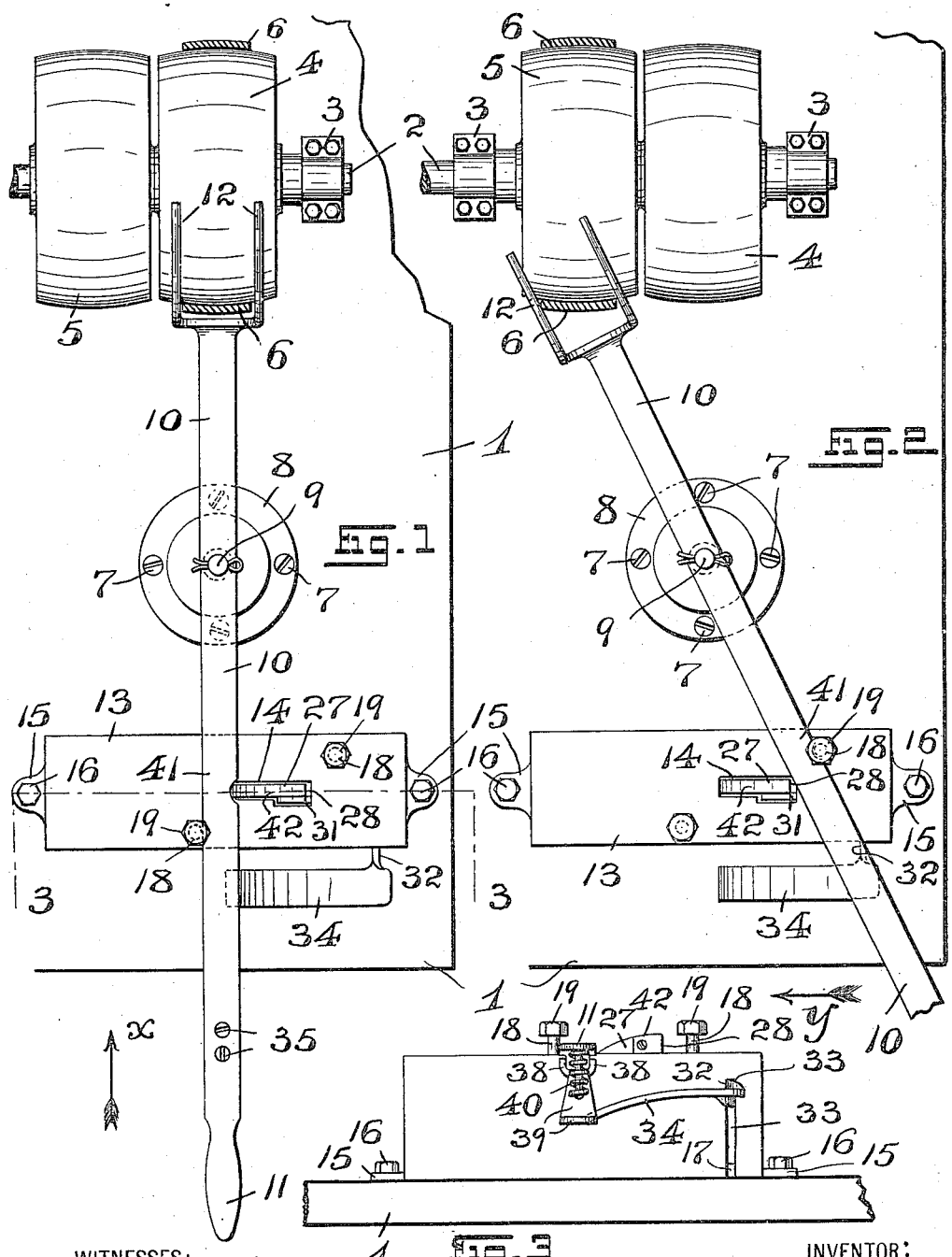

1,152,781.

Patented Sept. 7, 1915.
2 SHEETS—SHEET 2.

WITNESSES:
Fredk. W. Frantzel
Eva E. Aesch.

INVENTOR:
Robert T. Boal,
BY
Frantzel and Richards,
ATTORNEYS

UNITED STATES PATENT OFFICE.

ROBERT T. BOAL, OF KEARNEY, NEW JERSEY.

SAFETY BELT AND CLUTCH SHIFTING MECHANISM.

1,152,781.  Specification of Letters Patent.  Patented Sept. 7, 1915.

Application filed December 15, 1914. Serial No. 877,284.

*To all whom it may concern:*

Be it known that I, ROBERT T. BOAL, a subject of the King of England, residing at Kearney, in the county of Hudson and State of New Jersey, have invented certain new and useful Improvements in Safety Belt and Clutch Shifting Mechanism; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in shifting mechanisms for belts employed with machines of the various kinds and for operating clutches; and, the invention relates, more particularly, to a safety-attachment for shifting devices for the purposes above stated, with a view of providing a belt or clutch-shifter which can be easily manipulated, but the operating lever of which is automatically locked, when in its shifted position, against accidental displacement.

The present invention has for its principal object to provide a simply constructed and easily operated belt or clutch-shifter of the general character hereinafter more particularly specified, and which is of such construction that the operating lever of the mechanism is automatically locked against accidental displacement in certain of its shifted positions.

Other objects of the present invention not at this time more particularly enumerated will be clearly understood from the following detailed description of the present invention.

With the various objects of the invention in view, the said invention consists, primarily, in the novel belt or clutch-shifter hereinafter more fully set forth; and, the invention consists, furthermore, in the novel arrangements and combinations of the several devices and parts, as well as in the details of the construction of said parts, all of which will be described in detail in the following specification, and then finally embodied in the clauses of the claims which are appended to and which form an essential part of the said specification.

The invention is clearly illustrated in the accompanying drawings, in which:—

Figure 4:
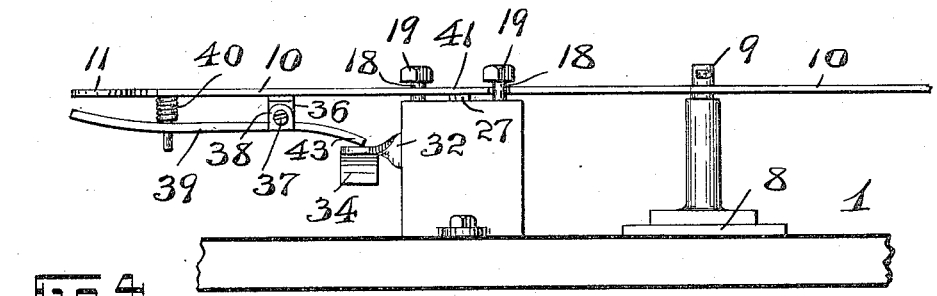
Figure 5:
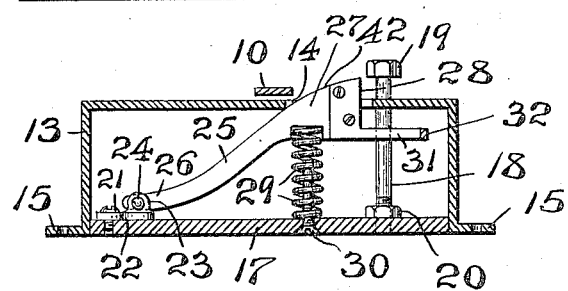
Figure 6:
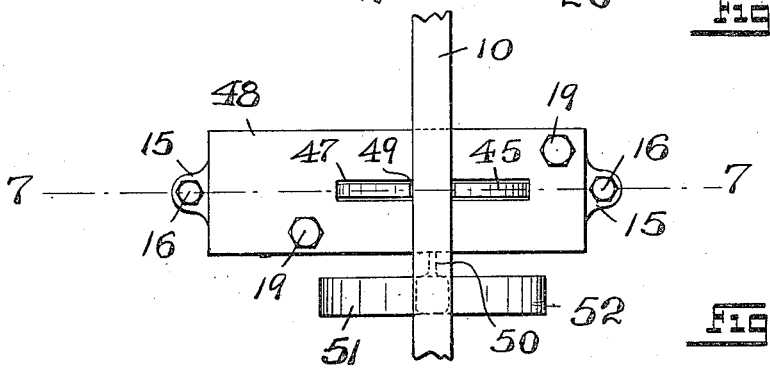
Figure 7:
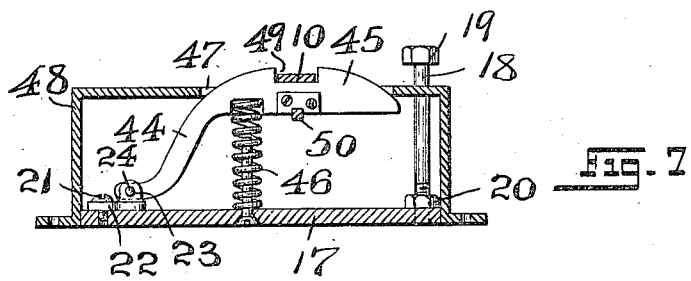

Figure 1 is a plan view of a portion of the bed-plate of a machine, showing in connection therewith, and also in plan view, a belt-shifting mechanism made according to the principles of the present invention and illustrating one embodiment of the same, the various parts of the mechanism being represented in their relative positions when the belt is running upon the fast pulley; and Fig. 2 is a similar view of the parts represented in said Fig. 1, but illustrating the relative positions of the parts of the shifting mechanism, when the operating lever has been moved into its safety-locked position and when the belt is running upon the loose pulley. Fig. 3 is a front elevation of the bed-plate of the machine, and a front elevation of the belt-shifting mechanism, looking in the direction of the arrow $x$ in said Fig. 1 of the drawings; and Fig. 4 is a side elevation of the bed-plate of the machine and of the belt-shifting mechanism, looking in the direction of the arrow $y$ in Fig. 2. Fig. 5 is a longitudinal vertical section of the belt-shifting mechanism, said section being taken on line 3—3 in Fig. 1, the lever-locking means of the shifting mechanism being shown in elevation. Fig. 6 is a plan-view of a clutch-operating mechanism, embodying the principles of the present invention, showing in connection therewith a portion of the clutch-operating lever in its safety-locked position; and Fig. 7 is a longitudinal vertical section of the same, said section being taken on line 7—7 in said Fig. 6, the lever-locking means of the shifting mechanism being shown in elevation.

Similar characters of reference are employed in the said above described views, to indicate corresponding parts.

Referring now to the several figures of the drawings, the reference-character 1 indicates a portion of the bed-plate of any machine with which the belt or clutch-shifting mechanism is to be used, and 2 indicates the usual shaft, suitably mounted upon said bed-plate 1 in bearings, as 3, or otherwise. Mounted upon said shaft 2 is the usual fast pulley 4 and loose pulley 5, and 6 indicates a suitable belt which is to be shifted from pulley 4 to pulley 5, or from the pulley 5 to the pulley 4, as the case may be. Suitably mounted upon said bed-plate 1, by means of screws 7, or in any other suitable manner, is a support, as 8, or the like, which carries a suitably formed pivot-post or pin, as 9, upon which is pivotally mounted a shifting lever 10, provided at one end with a handle 11 and at its other end with the usual and suitably formed belt-embracing and engaging fingers 12, or other suitably formed belt-engaging means for moving the belt back and forth over the faces of the pulleys.

The lever-locking mechanism, referring now more particularly to Figs. 1, 2, 3, 4 and 5 of the drawings, comprises a suitably formed box or casing, as 13, in the top of which is a suitably shaped slot or elongated opening, as 14. The said box or casing is secured upon the bed-plate 1, in the proper position, usually by means of perforated ears 15 and bolts or screws 16, but it will be understood that any other suitable means of fastening may be employed, if found necessary and desirable under different circumstances. Suitably fitted within the said box or casing and resting upon the bed-plate 1 is a plate 17, said plate being suitably secured upon the face of the bed-plate 1 by means of the screw-threaded end-portions of a pair of stop-bolts 18, which may be placed in a staggered relation shown more particularly in Figs. 1 and 2 of the drawings. The said stop-bolts 18 extend in upward directions in the box or casing and through suitably disposed perforations in the top of the box or casing, extending a short distance above the said top, and being provided with heads, as 19, which may be used to screw said bolts in position, as will be evident. Each bolt 18 may be provided upon its screw-threaded portion with a nut, as 20, which is previously adjusted, so as to bring the heads of the bolts 18 at their proper heights above the top of the box or casing, when the bolts are fixed in place. The previously mentioned shifting lever 10 moves between the said stop-bolts 18, above the top of the box or casing, said bolts acting as stops to limit the movements of the lever 10 and to regulate the throw of the belt or clutch-engaging portion of said lever, as will be clearly evident. Within the said box or casing, and suitably secured upon the plate 17, in the proper location, by means of a screw or bolt 21, is a plate 22 formed with a pair of upwardly extending and perforated ears 23. Mounted in said ears 23 is a laterally extending pivot-pin 24, and suitably mounted upon said pin 24 is the perforated end-portion 26 of a locking arm 25. Said arm, as will be seen from an inspection of Fig. 5 of the drawings, is curved in an upward direction, and is made with a suitably enlarged portion, as 27, and a locking off-set, as 28, a coiled spring 29, suitably mounted upon a pin or screw 30 which extends from the said plate 17, being employed for normally forcing a portion of said enlarged portion and the said off-set into and through the slot or elongated opening 14 in the top of the box or shell, substantially in the manner shown in the several figures of the drawings. The said locking arm 25 is also provided with a longitudinally extending member or portion, as 31, from which projects laterally, at the free end of said member, a finger, as 32, said finger extending into and through a vertically extending slot or opening 33 in the side of the box or casing 13, so as to project for a distance from the side of said box or casing, as shown. The projecting portion of the said finger 32 is provided with an extension, as 34, said extension being suitably curved in a downward direction and projecting in a direction toward the shifting lever 10. Near the grasping end-portion or handle of the shifting lever, the latter has secured by means of screws 35, or in any other suitable manner, upon its under surface, a pivot post, as 36, with which is pivotally connected by means of a pin 37 and perforated ears 38, an arm 39, preferably of the configuration shown in Fig. 4 of the drawings. In its normal position, the said arm 39 is in the position indicated in the dotted outline in said Fig. 4, being caused to assume this position by a suitable arrangement of a coiled spring 40, suitably disposed and located between the grasping end-portions of the shifting lever 10 and the said arm 39.

Having thus in a general manner described the construction and arrangement of the parts of the belt-shifting mechanism illustrated in said Figs. 1 to 5 inclusive, I will now briefly set forth their operation.

Suppose the belt-shifting lever is in the position indicated in Fig. 1 of the drawings, with the belt 6 thereby retained in its operative relation with the fast pulley 4 and it is desired to slide or shift the belt upon the loose pulley 5. The operator by taking hold of the handle 11 of the lever 10, or by applying force to the side of the said handle, readily swings the lever 10 into the position illustrated in Fig. 2 of the drawings, thereby moving the belt 6 from the fast pulley 4 upon the loose pulley 5, and simultaneously moving the part 41 of the lever 10 over the curved upper edge-portion 42 of the previously-mentioned enlargement 27 of the locking arm 25, and causing said part 41 of the lever 10 to drop into the space between the upper projecting parts of the locking offset 28 and of the stop-bolt 18 located to the right of said off-set. In this position, the belt-shifting lever 10 is positively locked against accidental displacement, so that the belt 6 cannot be shifted from the loose pulley 5 upon the fast pulley 4 to start up the machine, when the latter is to remain at rest, as will be clearly understood. When the lever 10 is in the position represented in said Fig. 2, the end-portion 43 of the arm 39 has been moved directly above the projecting part of the previously-mentioned finger 32. When it is desired to start up the machine, and it is necessary to shift the belt 6 from the loose pulley 5 back upon the fast pulley 4, the operator firmly grasps in one hand, both grasping end-portions of the lever 10 and the arm 39, thereby producing a downward movement of the end-portion 43 of the arm 39 toward and directly upon the projecting portion of the finger 32, and thereby moving the enlarged portion 27 of the spring-controlled and pivoted arm 25 down into the slot or opening 14 in the top of the casing or box 13, so that the locking off-set 28 is disengaged from its arresting contact with the side of the belt-shifting lever, and the latter can now be swung into its former position, indicated in Fig. 1 of the drawings. When the hand-portions of the lever 10 and arm 39 are released, the compressed springs 29 and 40 will respectively return the locking arm 25 and the arm 39 to their normal positions, as will be clearly evident.

The purpose of the previously-mentioned extension 34 employed in connection with the projecting portion of the finger 32 is to permit the end-portion 43 of the arm 39 to ride up the curved surface of said extension 34 in bringing it above the finger 32, should the operator, in moving the handle-portion of the shifting lever 10 from left to right, grasp and operate the arm 39 so as to bring said arm 39 into the position indicated in Fig. 4 of the drawings, whereby the device is not rendered inoperative, as might be the case if such extension 34 were not present, and whereby in that case the said end-portion 43 of the arm 39 might be brought into inoperative relation beneath the projecting portion of the finger 32.

When the present invention is to be applied to a shifting mechanism for use with a clutch-mechanism, in which case the lever 10 in its normal initial relation to the two usual clutch-members must stand centrally between the said members, the mechanism is provided with a spring-controlled locking-arm or element, as 44, see Fig. 7 of the drawings, having a segmental enlargement, as 45, forced, normally, by the spring 46 into the slot or opening 47 in the top of the box or casing 48, as shown in Figs. 6 and 7. In its upper edge-portion the said enlargement 45 has a locking recess 49 in which the shifting lever 10 rests against movement. The said locking arm or element 44 also has a finger, as 50, extending through and projecting from the side of the box or casing with which a spring-controlled arm, pivoted to the lever 10 in the manner described in connection with the belt-shifter illustrated in Figs. 1 to 5 inclusive, can be brought into engagement by the operator for depressing the said spring-controlled locking arm or element 44 and its segmental enlargement 45, to enable the shifting lever 10 to be moved to the right or left, as will be clearly evident. For the same purpose as the extension 34 used in connection with the finger 32, the above-mentioned finger 50 is provided with the oppositely extending and downwardly curved extensions 51 and 52 shown in Fig. 6 of the drawings. The manner of pivoting the shifting lever 10, and other parts contained in and used with the box or casing 48 may be the same, as illustrated in connection with the belt-shifting device represented in said Figs. 1 to 6 inclusive.

Of course, I am aware that changes may be made in the general arrangements and combinations of the various devices and parts, as well as in the details of the construction of the said parts, without departing from the scope of the present invention as set forth in the foregoing specification, and as defined in the claims which are appended to the said specification. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A safety belt and clutch-shifting mechanism comprising in combination with a swinging shifting lever, a spring-controlled locking arm having a portion with which said lever can be brought into locked engagement, and means connected with said lever adapted to be brought into engagement with said locking arm for releasing said lever from its locked engagement with said arm.

2. A safety belt and clutch-shifting mechanism comprising in combination with a swinging shifting lever, a spring-controlled locking arm having a portion with which said lever can be brought into locked engagement, and means connected with said locking arm for releasing said lever from its locked engagement with said arm, and stop-bolts located with relation to said locking arm to limit the swinging movements of said shifting lever.

3. A safety belt and clutch-shifting mechanism comprising in combination with a swinging shifting lever, a pivoted and spring-controlled locking arm having a portion with which said lever can be brought into locked engagement, and means connected with said lever adapted to be brought into engagement with said locking arm for releasing said lever from its locked engagement with said arm.

4. A safety belt and clutch-shifting mechanism comprising in combination with a swinging shifting lever, a pivoted and spring-controlled locking arm having a portion with which said lever can be brought into locked engagement, means connected with said lever adapted to be brought into engagement with said locking arm for releasing said lever from its locked engagement with said arm, and stop-bolts located with relation to said locking arm to limit the swinging movements of said shifting lever.

5. A safety belt and clutch-shifting mechanism comprising in combination with a swinging shifting lever, a casing provided in its top with an opening, a spring-controlled locking arm pivoted in said casing, said arm extending upwardly and having a locking enlargement extending into and through the opening in said casing so as to normally project above the top of said casing, said enlargement having a portion with which said lever is adapted to be brought into locked engagement, and means connected with said lever adapted to be brought into engagement with said pivoted locking arm to withdraw the locking enlargement of said arm beneath the opening in the top of said casing to thereby disengage said lever from its locked engagement with said arm.

6. A safety belt and clutch-shifting mechanism comprising in combination with a swinging shifting lever, a casing provided in its top with an opening, a spring-controlled locking arm pivoted in said casing, said arm extending upwardly and having a locking enlargement extending into and through the opening in said casing so as to normally project above the top of said casing, said enlargement having a portion with which said lever is adapted to be brought into locked engagement, means connected with said lever adapted to be brought into engagement with said pivoted locking arm to withdraw the locking enlargement of said arm beneath the opening in the top of said casing to thereby disengage said lever from its locked engagement with said arm, and stop-bolts connected with said casing and located with relation to said locking arm to limit the swinging movements of said shifting lever.

7. A safety belt and clutch-shifting mechanism comprising in combination with a swinging shifting lever, a casing provided in its top with an opening and in one of its sides with another opening, a spring-controlled locking arm pivoted in said casing, said arm extending upwardly and having a locking enlargement extending into and through the opening in the top of said casing so as to normally project above said top of the casing, said enlargement having a portion with which said lever is adapted to be brought into locked engagement, a finger connected with and extending from said locking arm into and through the opening in the side of said casing, and means connected with said lever adapted to be brought into engagement with said finger to depress said pivoted locking arm and withdraw the locking enlargement of said arm beneath the opening in the top of said casing to thereby disengage said lever from its locked engagement with said arm.

8. A safety belt and clutch-shifting mechanism comprising in combination with a swinging shifting lever, a casing provided in its top with an opening and in one of its sides with another opening, a spring-controlled locking arm pivoted in said casing, said arm extending upwardly and having a locking enlargement extending into and through the opening in the top of said casing so as to normally project above said top of the casing, said enlargement having a portion with which said lever is adapted to be brought into locked engagement, a finger connected with and extending from said locking arm into and through the opening in the side of said casing, means connected with said lever adapted to be brought into engagement with said finger to depress said pivoted locking arm and withdraw the locking enlargement of said arm beneath the opening in the top of said casing to thereby disengage said lever from its locked engagement with said arm, and stop-bolts connected with said casing and located with relation to said locking arm to limit the swinging movements of said shifting lever.

9. A safety belt and clutch-shifting mechanism comprising in combination with a swinging shifting lever, a casing provided in its top with an opening and in one of its sides with another opening, a spring-controlled locking arm pivoted in said casing, said arm extending upwardly and having a locking enlargement extending into and through the opening in the top of said casing so as to normally project above said top of the casing, said enlargement having a portion with which said lever is adapted to be brought into locked engagement, a finger connected with and extending from said locking arm into and through the opening in the side of said casing, and a spring-controlled grasping arm pivotally connected with said shifting lever having a portion adapted to be brought into engagement with said finger to depress said pivoted locking arm and withdraw the locking enlargement of said arm beneath the opening in the top of said casing to thereby disengage said lever from its locked engagement with said arm.

10. A safety belt and clutch-shifting mechanism comprising in combination with a swinging shifting lever, a casing provided in its top with an opening and in one of its sides with another opening, a spring-controlled locking arm pivoted in said casing, said arm extending upwardly and having a locking enlargement extending into and through the opening in the top of said casing so as to normally project above said top of the casing, said enlargement having a portion with which said lever is adapted to be brought into locked engagement, a finger connected with and extending from said locking arm into and through the opening in the side of said casing, a spring-controlled grasping arm pivotally connected with said shifting lever having a portion adapted to be brought into engagement with said finger to depress said pivoted locking arm and withdraw the locking enlargement of said arm beneath the opening in the top of said casing to thereby disengage said lever from its locked engagement with said arm, and stop-bolts connected with said casing and located with relation to said locking arm to limit the swinging movements of said shifting lever.

11. A safety belt and clutch-shifting mechanism comprising in combination with a swinging shifting lever, a casing provided in its top with an opening and in one of its sides with another opening, a spring-controlled locking arm pivoted in said casing, said arm extending upwardly and having a locking enlargement extending into and through the opening in the top of said casing so as to normally project above said top of the casing, said enlargement having a portion with which said lever is adapted to be brought into locked engagement, a finger connected with and extending from said locking arm into and through the opening in the side of said casing, a spring-controlled grasping arm pivotally connected with said shifting lever having a portion adapted to be brought into engagement with said finger to depress said pivoted locking arm and withdraw the locking enlargement of said arm beneath the opening in the top of said casing to thereby disengage said lever from its locked engagement with said arm, and a downwardly curved member extending from the side of said finger, substantially as and for the purposes set forth.

12. A safety belt and clutch-shifting mechanism comprising in combination with a swinging shifting lever, a casing provided in its top with an opening and in one of its sides with another opening, a spring-controlled locking arm pivoted in said casing, said arm extending upwardly and having a locking enlargement extending into and through the opening in the top of said casing so as to normally project above said top of the casing, said enlargement having a portion with which said lever is adapted to be brought into locked engagement, a finger connected with and extending from said locking arm into and through the opening in the side of said casing, a spring-controlled grasping arm pivotally connected with said shifting lever having a portion adapted to be brought into engagement with said finger to depress said pivoted locking arm and withdraw the locking enlargement of said arm beneath the opening in the top of said casing to thereby disengage said lever from its locked engagement with said arm, a downwardly curved member extending from the side of said finger, and stop-bolts connected with said casing and located with relation to said locking arm to limit the swinging movements of said shifting lever.

In testimony, that I claim the invention set forth above I have hereunto set my hand this 9th day of December, 1914.

ROBERT T. BOAL.

Witnesses:
FREDK. C. FRAENTZEL,
FRED'K H. W. FRAENTZEL.

Copies of this patent may be obtained for five cents each, by addressing the "Commissioner of Patents, Washington, D. C."